United States Patent [19]

Bernin

[11] 3,860,883

[45] Jan. 14, 1975

[54] MAGNETICALLY OPERATED ELECTRONIC GAIN CONTROL

[75] Inventor: Victor Maurice Bernin, Mount Prospect, Ill.

[73] Assignee: Illinois Tool Works, Inc., Chicago, Ill.

[22] Filed: Mar. 22, 1974

[21] Appl. No.: 453,620

[52] U.S. Cl. .................... 330/29, 323/51, 330/86, 330/137, 336/110

[51] Int. Cl. .................... H03g 3/30

[58] Field of Search .................... 330/52, 29, 86, 137; 323/51, 92; 336/110, 135

[56] References Cited

UNITED STATES PATENTS

| | | | |
|---|---|---|---|
| 3,314,002 | 4/1967 | Wellford | 323/92 X |
| 3,323,040 | 5/1967 | Wright | 323/92 X |
| 3,521,210 | 7/1970 | Iwata et al. | 336/135 X |
| 3,648,117 | 3/1972 | Yamamoto et al. | 336/110 X |
| 3,715,675 | 2/1973 | Chibana | 330/86 X |

*Primary Examiner*—James B. Mullins

[57] ABSTRACT

A magnetically operated electronic gain circuit which has a magnetic core, an input winding on the core which is coupled to a pulse source and an output winding on the core which is coupled to an output circuit is disclosed. The degree of magnetic saturation of the magnetic core is regulated by a permanent magnet which is controlled so that the air gap between the permanent magnet and the magnetic core varies as a function of the rotation of a shaft. An operational amplifier, for amplifying input signals, has an insulated-gate, field-effect feedback transistor coupled across it: The feedback transistor has its gate coupled to receive a control signal derived from the secondary winding of the magnetic core.

2 Claims, 2 Drawing Figures

MAGNETICALLY OPERATED ELECTRONIC GAIN CONTROL

BACKGROUND OF THE INVENTION

The gain of electronic amplifier circuits is conventionally controlled either manually or automatically by means of a potentiometer. In the conventional potentiometer, a wiping arm moves across portions of the resistance windings or the area of the potentiometer so that only a fraction of the total resistance is inserted into the circuit in accordance with the setting of the wiping arm. As is well known, mechanical connections, such as those provided in the conventional potentiometer, tend to be unreliable and of limited life span due to wear, corrosion and pitting and mechanical failures.

It is an object of the present invention to provide a gain control circuit in which an air gap between a permanent magnet and a saturable magnetic core transformer is controlled so as to provide a regulated output signal from the control device.

It is another object of the present invention to provide a variable gain operational amplifier in which a field-effect transistor, preferably of the insulated-gate type, has its drain-to-source path coupled between the input and the output of the amplifier, and has its gate coupled to receive a control signal, which preferably is provided by a contactless control element.

It is a further object of the present invention to provide a contactless control device in which a saturable magnetic element has a primary winding which receives a time-varying signal and a secondary winding coupled to receive a control signal from a signal convertor, wherein the magnitude of an air gap between a permanent magnet and saturable magnetic core is controlled so as to regulate the level of the control signal from the signal convertor.

It is an additional advantage of the present invention to provide a control device that supplies a control signal which is dependent on the air gap between a permanent magnet and a saturable magnetic core transformer to a control element that has a variable resistance path which is coupled between the input and the output of an amplifier, wherein the magnitude of the resistance of the resistance path is a function of the magnitude of the control signal.

Other advantages and objects within the scope of the present invention may be apparent to those skilled in the art from the disclosure found herein.

DESCRIPTION OF THE DRAWINGS

The present invention is illustrated in the drawings in which.

TECHNICAL DESCRIPTION OF THE INVENTION

Figure 1:
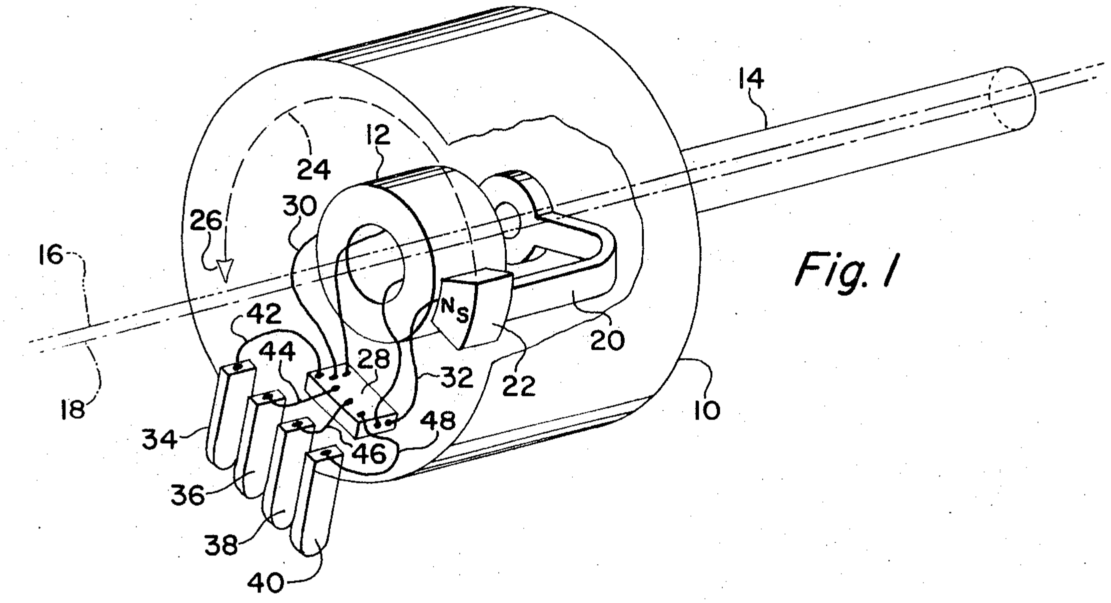
FIG. 1 is a perspective view of a rotatable shaft version of the control device of the present invention.

One version of the present invention is shown in FIG. 1 in which a cylindrical housing 10 encloses a saturable magnetic core 12, which is preferably of a torroidal shape and is mounted in the interior of the housing 10. A shaft 14 is rotatably mounted on the case 10, by any suitable conventional means, so that the axis 16 of the core 12 and the axis 18 of the shaft 14 are offset with respect to each other. At the end of the shaft 14 there is a support arm 20 which has the permanent magnet 22 secured at its inner end. As the shaft 14 is rotated, the permanent magnet 22 traverses the path 24, indicated by the dotted lines, with the result that the air gap spacing between the permanent magnet 22 and the magnetic core 12 will increase as the magnet moves from the position it is shown in FIG. 1 toward the position occupied by the arrowhead 26. When the permanent magnet 22 is at a position shown in FIG. 1, the magnetic core 12 is magnetically saturated. When the permanent magnet 22 is at the position corresponding to the location of the arrowhead 26, the magnet 22 is sufficiently removed from the magnetic core 12 so that it is relatively magnetically unsaturated and only a minor portion of the magnetic flux from the permanent magnet 22 affects the magnetic core 12.

The housing 10 may also contain electronic circuitry which may be manufactured on a single integrated circuit chip 28 that can be mounted on an inner wall of the housing 10. The electronic circuitry of the chip 28 supplies a time-varying signal, such as pulses, to a primary winding 30 on the core 12. The time-varying pulses supplied to the primary winding 30 will provide time-varying output signals on a secondary winding 32, which is also wound on the core 12, when the magnetic core 12 is magnetically unsaturated; (i.e., when the permanent magnet 22 is positioned in the vicinity of the arrowhead 26). However, when the permanent magnet 22 is positioned in close proximity to the magnetic core 12, the magnetic core 12 will be magnetically saturated; (i.e, when the permanent magnet 22 is at the position shown in FIG. 1). Thus, the input pulses which are supplied to the primary winding 30 will not provide the time-varying output signals on the secondary winding 32 when the core 12 is saturated.

In the embodiment shown in FIG. 1, the power source for the chip 28 is located externally of the housing 10 and input power and output signal connections are made to the chip 28 through the connecting pins 34, 36, 38 and 40. These pins are preferably constructed so that they will fit into a connector on a printed circuit board. The pins 34, 36, 38 and 40 are connected to the chip 28 by the lead wires 42, 44, 46 and 48, respectively.

As the permanent magnet 22 moves between the location that it is pictured at in FIG. 1 towards the arrowhead 26, the amount of magnetic saturation of the core 12 varies in substantially a linear manner. The magnitude of the output signals or pulses that are developed on the secondary winding 32 are directly proportional to the air gap spacing between the permanent magnet 22 and the saturable magnetic core 12 and thus inversely proportional to the magnetic saturation of the core 12.

Figure 2:
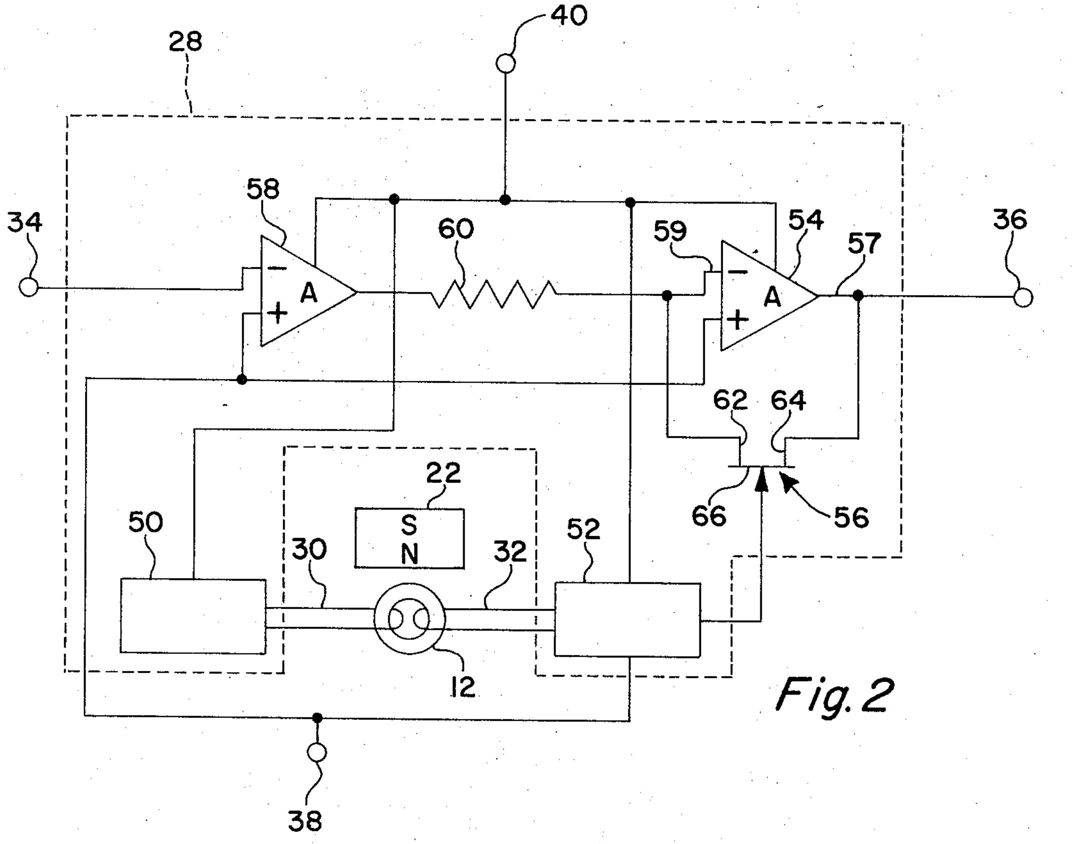
FIG. 2 is a schematic illustration of circuitry that may be employed to implement the control device.

The circuit, which is contained on the chip 28, is shown in the schematic illustration of FIG. 2. Also shown in schematic form in FIG. 2 is the permanent magnet 22, the saturable magnetic core 12, the primary winding 30, the secondary winding 32, and the connecting pins 34, 36, 38 and 40.

The primary winding 30 is supplied time-varying signals by a driver 50, which preferably is a periodic pulse source. A pulse-to-level convertor 52 is coupled to the secondary winding 32. The convertor 52 is a conventional A.C./D.C. level convertor which converts the output signals on the winding 32 to a D.C. level. The D.C. output from the level convertor 52 is utilized as a control signal to regulate the gain of an operational amplifier 54 by controlling the feedback element 56 of the amplifier 54. Power is supplied to the unit across the pins 38 and 40. The input signal to the amplifier 54 is supplied across the pins 34 and 38, and is amplified by the impedance matching amplifier 58 before it is coupled to the input of the amplifier 54. The output of the amplifier 58 is coupled to the input of the variable gain amplifier 54 through a limiting resistor 60. The feedback element 56 of the amplifier 54 is preferably a field-effect transistor of the insulated-gate type. The feedback element 56 has a drain 62, a source 64 and a gate 66 which is coupled between the output terminal 57 and the inverting input terminal 59 of the operational amplifier 54. The drain-to-source path of the feedback transistor 56 provides the variable feedback resistance that controls the gain of the amplifier 54.

The output signal from the amplifier 54 is taken between the pins 36 and 38. The magnitude of this output signal is directly proportional to the magnitude of the input signal, and to the ratio of the drain-to-source resistance to the resistance of the resistor 60. Thus, the larger the ratio of the drain-to-source path resistance to the resistance of the resistor 60, the greater will be the magnitude output signal across the terminal 36 and 38. The resistance of the feedback path of the feedback element 56 is controlled by the magnitude of the signal that is coupled from the convertor 52 to the gate 66. An insulated-gate, field-effect, P-channel transistor, such as a metal-oxide semiconductor (MOS) transistor, operating in the enhancement mode is preferred as the feedback element 60. This type of transistor will operate in the enhancement mode if the gate voltage is more negative than the source voltage so that an increase in the gate bias causes a decrease in the resistance of the source-to-drain feedback path in this mode.

While a specific version of the present invention has been shown, it will be recognized that the present invention may be implemented within the scope of the present invention by means other than a rotatable shaft. For example, a mechanical slide mechanism or other adjustment mechanism may be used to control the air gap spacing between the permanent magnet 22 and the magnetic core 12.

What is claimed is:

1. A contactless self-contained electrical control device comprising a housing, an integrated circuit chip mounted in said housing, a plurality of leads extending from said housing and electrically connected to the circuit of said chip, said circuit comprising output means, an amplifier having an input terminal for receiving an input signal, an output terminal for supplying an output signal, control means having a control terminal and a variable resistance path coupled between said input terminal and said output terminal of said amplifier, the magnitude of the resistance of said variable resistance path being a function of a control signal that is coupled to said control terminal and a driver means; a saturable magnetic torroidal core having a central axis mounted in said housing, a permanent magnet, a shaft having a central axis rotatably mounted with respect to said housing and having an inner end which extends into said housing and an outer end which extends outwardly of said housing, a support means mounted on said inner end of said shaft for supporting said permanent magnet in said housing in proximity to said magnetic core, said central axis of said core being offset from said central axis of said shaft so as to provide an air gap spacing between said permanent magnet and said core which is continuously variable as a function of a rotation of said shaft, a primary transformer winding which passes through said magnetic core and which has its ends connected to said circuit on said chip, a transformer secondary winding which passes through said magnetic core and which has its ends connected to said circuit on said chip, said driver means being constructed to supply a time-varying electrical signal to said primary winding and said output means being coupled to said secondary winding and to said control terminal for supplying said control signal to said control means, the position of said magnet being controlled by the rotation of said shaft so that the air gap spacing between said magnet and said torroidal core is regulated to any value that lies in a range between an air gap spacing at which said magnetic core is magnetically saturated to an air gap spacing at which said magnetic core is magnetically unsaturated and only a minor portion of the magnetic flux from said permanent magnet effects said magnetic core.

2. An electrical control device as claimed in claim 1 wherein said control means comprises an insulated-gate, field-effect transistor having its drain-to-source path coupled between said input terminal and said output terminal of said amplifier and its gate coupled to receive said control signal from said output means.

* * * * *